United States Patent Office 3,514,467
Patented May 26, 1970

3,514,467
GEL PERMEATION CHROMATOGRAPHY SEPARATION
James J. Zwolenik, Oakland, Calif., assignor to Chevron Research Company, San Francisco, Calif., a corporation of Delaware
No Drawing. Filed Mar. 17, 1967, Ser. No. 623,816
Int. Cl. C09b 47/02
U.S. Cl. 260—314                2 Claims

ABSTRACT OF THE DISCLOSURE

Separation of chlorophyll from carotenoid pigments in mixtures obtained from natural sources using gel permeation chromatography.

BACKGROUND OF THE INVENTION

Field of the invention

Chlorophyll and carotenoids are isolated together from extraction of plant sources of these materials. In many uses of chlorophyll or carotenoids, it is necessary that one be free of the other. Chlorophyll finds wide use in industry as coloring matter in foods, as a dye, as a deodorant in air aerosols and mouthwashes, as well as many other uses. For the most part, chlorophyll is isolated from natural sources by extraction means. See Kirk-Othmer, Encyclopedia of Chemical Technology, second edition, vol. 5 (1964), page 344 ff.

Carotenoids find extensive use as coloring agents and as precursors to Vitamin A. See Encyclopedia of Chemical Technology, supra, vol. 14, page 802.

Description of the prior art

Gel permeation chromatography is a relatively new tool for the separation of mixtures into various constituents. A recent article by K. H. Altgelt and J. C. Moore entitled "Gel Permeation Chromatography" in Polymer Fractionation, M. J. R. Cantow, Editor, Academic Press, New York (in press) describes the method and discusses the theory. Also, a recent article by K. H. Altgelt, Makromolekulare Chem., 88, 75 (1965) teaches the preparation of various gels for use in gel permeation chromatography.

SUMMARY OF THE INVENTION

It has now been found that chlorophyll can be readily and efficiently separated from carotenoid pigments in mixtures obtained from natural sources by gel permeation chromatography, by dissolving the mixture in a suitable solvent which is compatible with the gel used in the separation column, passing the solution through the column developing different bands and eluting the bands off the column and isolating the separated fractions of carotenoid pigment and chlorophylls.

Chlorophylls and carotenoids may be derived from various natural sources. Commercially, alfalfa is the ordinary source. However, chlorophyll may also be derived from spinach, stinging nettle or corn.

Various cross-linked hydrocarbon polymers may be used as the stationary phase in the chromatographic column, particularly cross-linked polystyrene, natural and synthetic rubber, polymethylmethacrylate, etc. Also, porous glass may find use. The polymers are graded by their ability to separate molecules of varying molecular weight. The gel used in the separation of chlorophyll and carotenoid pigments is graded as having a resolving range between molecular weight 3000 and molecular weight 30, preferably in the range of 30 to 750. At least about 10% of the pore shall be about equal to or somewhat greater than the size of one of the constituents in the mixture.

The molecular weight range for a cross-linked polymer is readily determined by fractionations on samples of known molecular weight distribution.

In order to obtain a satisfactory separation, it is necessary that a significant portion, better than 10% of the pore sizes, be at approximately the same or somewhat greater than the size of one of the constituents of the mixture which is to be separated. That is, as long as the pores are large enough for at least one of the constituents to enter and not so small that the constituent passes by unimpeded or its flow rate is not attenuated, then separation can be achieved. In effect, a significant percentage of the pores should be large enough to permit both constituents in a 2-constituent system to enter the pores, and preferably only one constituent in a 2-constituent system. (For a polyconstituent system, the pore size range should be large enough to accommodate at least all but one of the constituents to be individually separated.) When the pores are large enough to accommodate both constituents, the flow rate for the constituents will be attenuated at different rates when entering the pores and thus a separation will result. Where only one constituent is accommodated by the pore size, more rapid separation may be achieved, because while the rate of the smaller constituent through the column is significantly slowed, the larger constituent, which cannot enter the pores, rapidly passes through the column unimpeded.

The cross-linked polymers can be prepared by using a combination of mono- and diolefinic addition polymerizable olefins and copolymerizing them simultaneously. Methods for preparing different gels of different size can be found in Altgelt, Makromolekulare Chem., supra.

The solvent used is one having a solubility parameter in the range of from 7 to 12 and capable of extracting the chlorophyll and carotenoid pigments from the plant source. Usually, the solvent will be a mixed solvent having a hydrocarbon and an oxygenated solvent, e.g., ketonic. Illustrative hydrocarbon solvents include petroleum ether, benzene, etc. The hydrocarbon solvent may be diluted with a halohydrocarbon, e.g., chloroform. Illustrative oxygenated solvents include acetone, methylethylketone, etc. Usually dialkyl ketones of from 3 to 8 carbon atoms are used. The mixed solvents will generally be used in volume proportions of 3:1–1:3.

The theory and description of the method of carrying out a gel permeation chromatogram is found in an article by Altgelt and Moore, "Gel Permeation Chromatography," supra. The column is prepared by packing the gel in a solvent, usually the solvent system, adding the mixture of chlorophyll and carotenoid pigment as a concentrated solution to the column and then eluting the column with the solvent system. The materials form colored bands on the column and as the different fractions come off the column they are isolated and the solvent removed. With chlorophyll and carotenoid pigments, one obtains a distinct green band and a distinct yellow band.

The polymer used was prepared by the method described in Altgelt, Makromolekulare Chem., supra. The polymerization procedure is as follows. First, 40 g. of a polyvinyl alcohol stabilizer (Rhodoviol HS 100 obtained from Rhodia Inc., New York) was dissolved in 1600 cc. of water and heated to 80° C. A mixture of 120 ml. of divinylbenzene mix (53.5% divinylbenzene, 41.9% vinylethylbenzene and 3.5% diethylbenzene) and 680 ml. of styrene and 1 g. of azoisobutyronitrile was added to the water in a fine stream. The heating and stirring was continued for 24 hours. At the end of this time, the mixture was filtered through a fine screen, washed several times with hot water, followed by cold water, then repeatedly with acetone and repeatedly with benzene.

The polymer was then sized by removing fine particles (diameter equal to or less than 20μ) by a floating technique—by agitating the gel suspension with benzene and decanting the supernatant liquid; the coarse ones were removed by sieving through a 100-mesh screen. The polymer is then ready to be used.

A glass column 179 cm. long and 2 cm. in diameter was filled with the gel, the solvent system being a 1:1 petroleum ether, acetone solvent. The pigment mixture used as a charge was an (1/1) acetone-petroleum ether soluble portion of Oxnard-grown commercial spinach. Half the leaves were dipped into liquid nitrogen until solid. The frozen leaves were combined with the remaining leaves in a blender. The blending time was minimized and the leaves were cooled during the grind. After filtering off the pulp, the acetone-petroleum ether was evaporated under a slight stream of nitrogen at room temperature. Fresh solvent in small quantity redissolved the dry material providing a solution which was used as a charge. A flow rate of 0.5 ml./min. prevailed throughout the run. A sharp separation of the chlorophyll from the carotenoid pigment was achieved.

It is evident that gel permeation chromatography provides a rapid and convenient means for separation and isolation of chlorophyll from carotenoid pigments as obtained from extracts from natural sources.

I claim:

1. A method of separating chlorophyll and carotenoid pigments obtained as mixtures from natural sources, which comprises dissolving the mixture in a solvent having a solubility parameter in the range of from 7 to 12 consisting essentially of a 3:1–1:3 by volume mixture of a hydrocarbon and a dialkyl ketone of from 3 to 8 carbon atoms and passing the solution through a column of a polystyrene gel with resolution in the range of 30 to 3,000 in the molecular weight range of one of the constituents.

2. A method according to claim 1, wherein the molecular weight range is in the range of 30 to 750.

References Cited

UNITED STATES PATENTS 3,258,467   6/1966   Anderson et al. _____ 260—314

HENRY R. JILES, Primary Examiner

H. I. MOATZ, Assistant Examiner

U.S. Cl. X.R.

260—666